United States Patent [19]

Randall et al.

[11] Patent Number: 4,766,835

[45] Date of Patent: Aug. 30, 1988

[54] ROPE CLEAT

[75] Inventors: Richard C. Randall, 27622 San Blas, Mission Viejo, Calif. 92692; Jimmy Myer; William R. Sanford, both of Riverside, Calif.

[73] Assignee: Richard C. Randall, Mission Viejo, Calif.

[21] Appl. No.: 94,868

[22] Filed: Sep. 10, 1987

[51] Int. Cl.[4] ............................................. B63B 21/04
[52] U.S. Cl. .................................. 114/218; 24/134 R; 24/134 P
[58] Field of Search ............. 114/218, 364; 24/132 R, 24/132 AA, 132 WL, 133, 134 R, 134 KA, 134 KB, 134 L, 134 N, 134 P

[56] References Cited

U.S. PATENT DOCUMENTS

| | | | |
|---|---|---|---|
| 1,486,507 | 3/1924 | Walker | 24/134 P |
| 2,315,196 | 3/1943 | Gallione | 114/218 |
| 2,836,870 | 6/1958 | Shea | 114/218 |
| 3,046,929 | 7/1962 | Piver | 114/218 |
| 3,265,032 | 8/1966 | Hume | 114/218 |
| 3,730,129 | 5/1973 | Helms | 114/218 |
| 3,750,611 | 8/1973 | Field | 114/218 |
| 3,758,922 | 9/1973 | Field | 114/218 |
| 3,765,061 | 10/1973 | Nash | 114/218 |
| 3,795,218 | 3/1974 | Merry | 114/218 |
| 4,084,532 | 4/1978 | Feder | 114/218 |
| 4,092,941 | 6/1978 | Gryglas | 114/218 |
| 4,217,847 | 8/1980 | McCloud | 114/218 |
| 4,278,042 | 7/1981 | Lindquist | 114/218 |
| 4,340,998 | 7/1982 | Voss | 24/130 |
| 4,348,974 | 9/1982 | Lerner | 114/218 |
| 4,397,253 | 8/1983 | Uecker | 114/218 |
| 4,453,486 | 6/1984 | Harken | 114/218 |
| 4,553,495 | 11/1985 | Lerner | 114/218 |
| 4,620,499 | 11/1986 | Slemmons | 114/218 |

Primary Examiner—Joseph F. Peters, Jr.
Assistant Examiner—Thomas J. Brahan
Attorney, Agent, or Firm—Allan R. Fowler

[57] ABSTRACT

A rope cleat includes a rectangular plastic bottom plate and a nesting sheet steel top plate. Bolt holes in the corners of the plates allow bolts to retain the plates together and to mount the cleat onto a mounting surface. A pair of cam spindles and back-to-back rope abutments, integral to the bottom plate, protrude through matching cam spindle openings and rope abutment openings in the top plate.

The edge of each cam spindle opening is rounded upward into a cam spindle boss to support the cam spindle. A cam, with rope gripping teeth on its rise, rotates on each cam spindle, is retained thereon by a washer and self tapping screw, and is biased by a C-shaped leaf spring.

The front of each rope abutment also has rope gripping teeth. The back of each rope abutment is reinforced by a boss, bent upward from the top plate to leave the rope abutment opening. Each boss is strengthened by a vertical crimp, the apex of which supports and is supported by the apex of the crimp in the other boss.

A footed retaining loop on the rope tension side of the cleat prevents the cleat from prematurely releasing the rope. The loop penetrates a slot in the top plate, and the top plate retains the feet of the loop in grooves in the bottom plate.

15 Claims, 2 Drawing Sheets

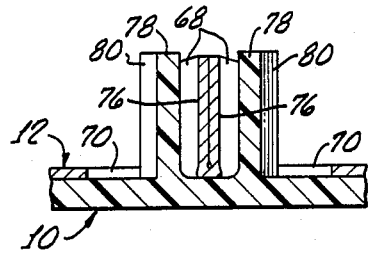
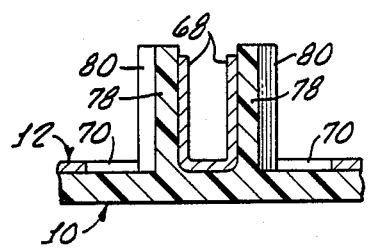
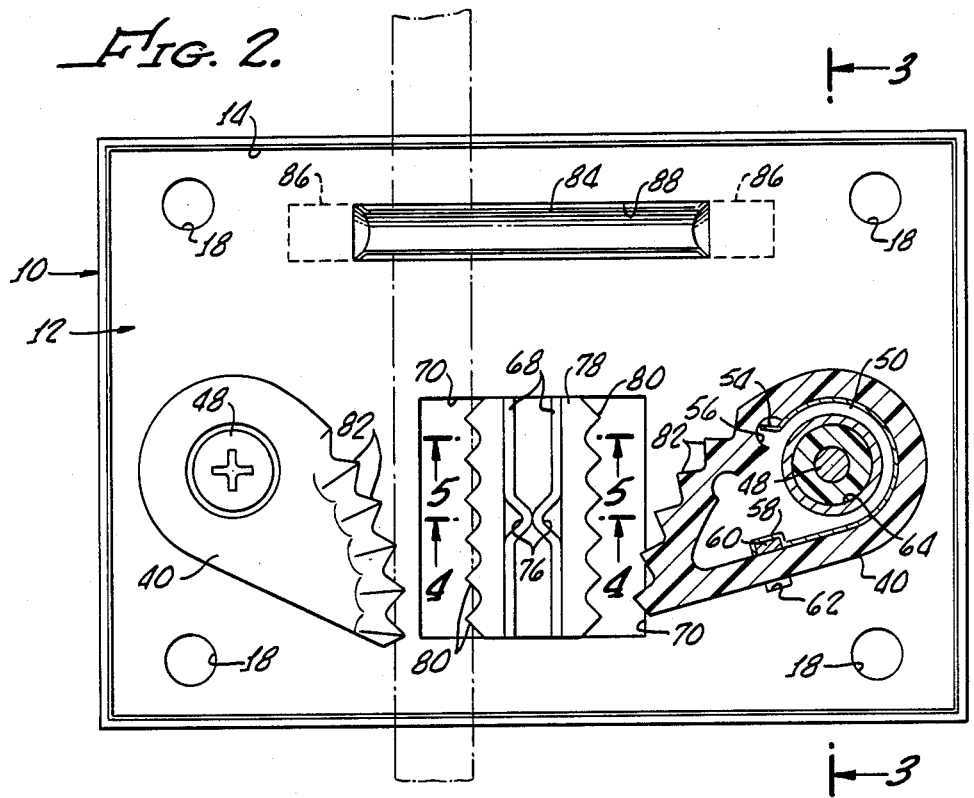
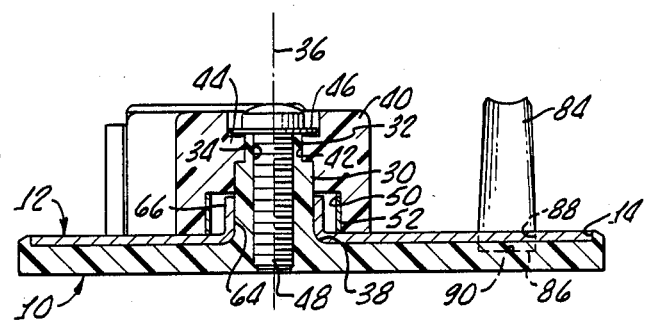

ROPE CLEAT

This invention relates to rope cleats, and more specifically has reference to cam cleats of a construction which is uniquely strong, yet easy to manufacture.

The present invention is generally applicable to ropes which must be held secure over a large range of tensions, yet which must be releasable when required. The use of a cam, the rise of which has a toothed gripping surface, has long been practiced to thus secure ropes. The cam may act either against another such cam or against a rope abutment. For typical cam cleats, see Merry, U.S. Pat. No. 3,795,218, and Walker, U.S. Pat. No. 1,486,507.

Cleat operation is straightforward. As the rope is drawn downward into the cleat, it spreads the cam from the complementary cam or rope abutment. As the rope, under tension, attempts to escape the cam, the rope engages the gripping surface on the rise of the cam, thereby rotating it. The "rise" and "drop" of the cam are defined in the present invention with reference to this direction of rotation. As the cam rotates, the rise presses more and more firmly into the rope, and the teeth on the rise grip and compress the rope with similarly increasing firmness. Eventually the rope is unable to be further compressed, which prevents the rise from further radial motion, which stops both the cam and the rope.

When a rope abutment is used instead of a second cam, it is desirable for its surface contacting the rope to also be toothed, so as to also grip the rope under tension and thereby partially relieve the strain on the cam.

A cam type rope cleat includes, as a minimum, a cam, a cam spindle upon which the cam rotates, a rope abutment against which the cam presses the rope, and a base which mounts the cam spindle and rope abutment; the base, in turn, being adapted to be mounted to the structure to which a tensioned rope is to be secured.

A principal object of the present invention is to provide a rope cleat structure which is easily manufactured, contains a minimum of separate parts requiring assembly, and is of very high strength without requiring the use of metal castings or forgings and machining thereof.

Accordingly, a rope cleat in accordance with the present invention combines two nested plates, a top plate and a bottom plate. The bottom plate is made of injection molded plastic with one or more integral cam spindles and rope abutments extending upwardly therefrom. The top plate is a metal stamping of thin sheet steel, and includes openings and adjacent upstanding bosses formed therein. The cam spindles and rope abutments of the bottom plate protrude through said top plate openings and reside against said top plate bosses.

Means are provided for connecting the top and bottom plates together in nested configuration. And, a cam is rotatably mounted on each protruding cam spindle, with the rise of each cam facing an associated rope abutment.

A rope cleat constructed in this manner has the requisite strength for heavy duty use, while at the same time is easily and inexpensively manufactured and assembled. Futher, this construction lends itself readily to the incorporation therein of additional desirable features for rope cleats, as further explained herein.

In a preferred embodiment of the invention, the top plate has an upturned rope abutment boss formed therein, with a corresponding rope abutment opening formed adjacent thereto. It also has a cam spindle opening formed therein at a distance therefrom on the side thereof opposite the upturned rope abutment boss.

The bottom plate has an upstanding rope abutment formed therein. This rope abutment extends through the rope abutment opening in the top plate. It has a rear surface in abutment with the upturned rope abutment boss of the top plate, and has a front surface facing away from the upturned rope abutment boss. The front surface has teeth formed on it. The bottom plate further includes an upstanding cam spindle formed at a distance from the rope abutment. The cam spindle extends through the cam spindle opening in the top plate.

The cam is rotatably mounted on the cam spindle of the bottom plate, above the top plate. The cam has a rise facing toward the rope abutment with teeth formed on the rise.

The rope abutment boss may include a vertical crimp for additional stiffening.

In a dual cleat version of the present invention, the top plate has a pair of central upturned rope abutment bosses formed therein, rather than a single upturned rope abutment boss, with a pair of corresponding rope abutment openings formed adjacent thereto. As before, a vertical crimp in each upturned rope abutment boss serves to further stiffen it. The crimp in each upturned rope abutment boss is made deep enough that its apex rests against the apex of the crimp in the other upturned rope abutment boss, thereby providing mutual reinforcement. The top plate also has a pair of cam spindle openings formed therein immediately outboard of the rope abutment openings, rather than a single such cam spindle opening.

The bottom plate in this version has a pair of upstanding rope abutments formed centrally therein, rather than a single rope abutment. These rope abutments extend through the rope abutment openings in the top plate. They are back to back, that is, they have rear surfaces in abutment with the central upturned rope abutment bosses of the top plate, and have front surfaces facing away from the central upturned rope abutment bosses. The front surfaces have teeth formed on them. The bottom plate further includes a pair of upstanding cam spindles formed at a distance from the rope abutments, rather than a single cam spindle. The cam spindles extend through the cam spindle openings in the top plate.

This version has a pair of cams, rather than a single cam. The cams are rotatably mounted on the cam spindles of the bottom plate, above the top plate. The cams have rises facing inboard with teeth formed on the rises.

Means are provided for retaining the cams on the cam spindles. In a preferred embodiment of the invention, each cam spindle includes an axial opening therethrough. In this version, the retaining means comprises an annulus formed on top of the cam spindle, a washer resting on top of the annulus, and a self-tapping screw retaining the washer on the annulus, and threadedly engaging the axial opening in the cam spindle. The cam includes an internal annular ridge protruding into the gap between the cam spindle and the washer.

The cam spindle may be strengthened by turning up and rounding the edge of the cam spindle opening in the top plate, thereby forming a cam spindle boss. The junction of the cam spindle with the bottom plate may then be rounded to nest with the rounding of the cam spindle boss in the top plate. Further strengthening is provided by selecting a screw long enough for the bottom of the screw to be below the top of the cam spindle boss.

Means are provided for biasing the rise of the cam toward the rope to be cleated. In a preferred embodiment of the invention, the bottom of the cam includes a recess and the top plate includes an upturned plate boss. In this embodiment, the biasing means comprises a C-shaped leaf spring in the recess, one end of which engages the rise side of the recess and the other end of which engages the plate boss. The plate boss engages the drop side of the recess when the cam is fully biased.

Means are provided for retaining the tension side of the rope approximately parallel to the top plate. In a preferred embodiment of the invention, the rope retaining means comprises a footed retaining loop, axially cambered for additional strength, penetrating a slot in the top plate, the feet of the loop being retained by the top plate in a groove in the bottom plate.

Means are provided for mounting the cleat onto a mounting surface beneath the bottom plate, wherein the mounting means include means for retaining the top plate against the bottom plate. In a preferred embodiment of the invention, the top and bottom plates each includes a plurality of openings around its peripheral apron, and the mounting means comprises a plurality of bolts, with associated washers and nuts, penetrating the openings and further penetrating a plurality of associated mounting openings in the mounting surface.

The above and other important features of the present invention will be better understood from the following detailed description of a preferred embodiment of the invention, made with reference to the accompanying drawings, in which:

FIG. 2 is an overhead plan view of the apparatus;

FIG. 3 is vertical cross section through a cam and the cam spindle on which it is mounted;

FIG. 4 is a central transverse vertical cross section through the rope abutments; and FIG. 5 is an off-center transverse vertical cross section through the rope abutments.

Figure 1:
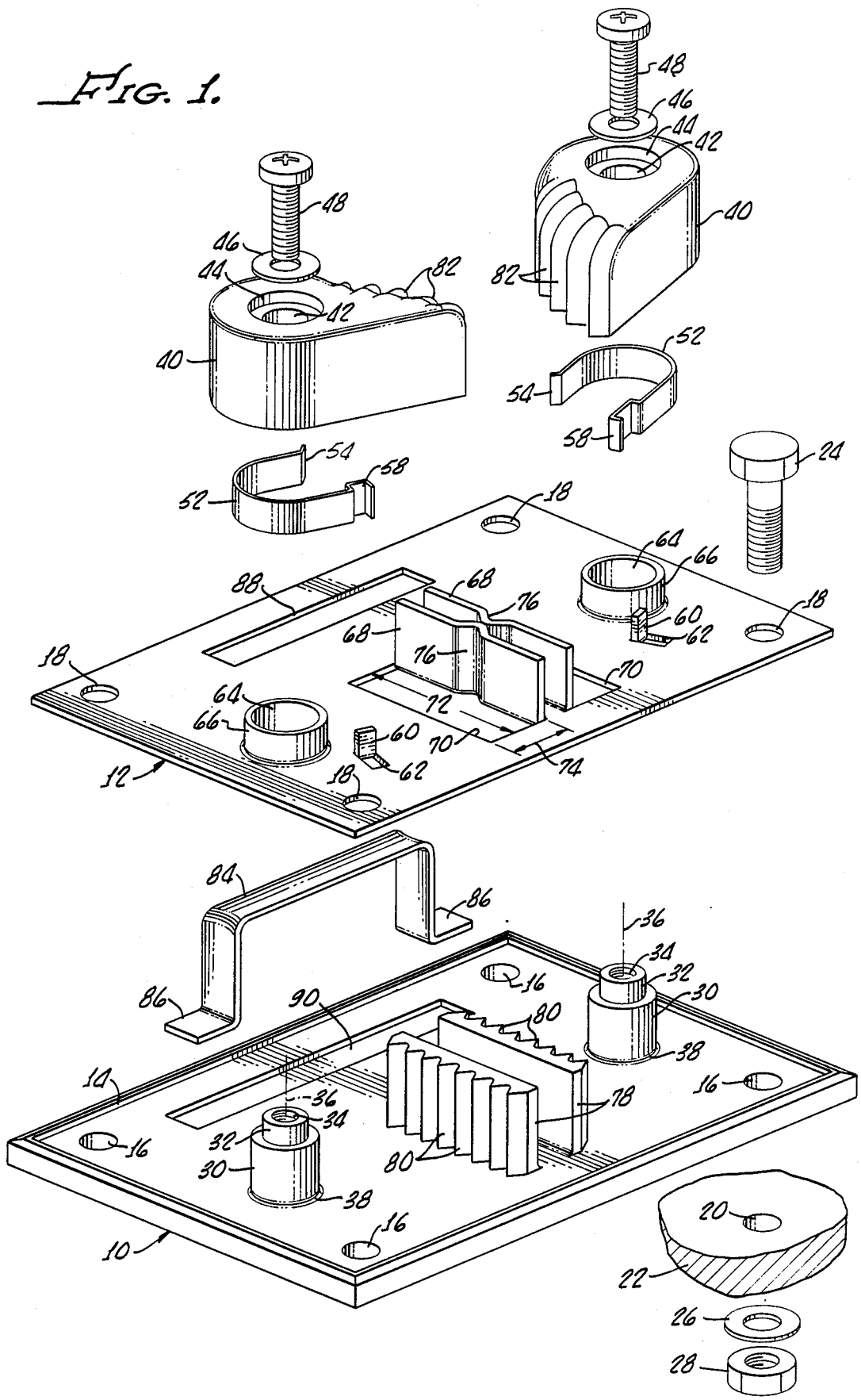
FIG. 1 is an exploded view of the apparatus.

Turning to FIG. 1, the cleat comprises a horizontal rectangular bottom plate 10 and a nesting horizontal rectangular top plate 12. The width of each plate (transverse direction) is approximately one-and-a-half times the length of that plate longitudinal direction). The bottom plate is preferably composed of plastic, such as RF-1006 Nylon 6/6 Glass Fiber 30°, available from LNP Engineering Plastics of Santa Ana, Calif. The top plate is preferably composed of sheet metal, such as 16 gauge 105 or 110 cold rolled sheet steel.

The nesting of the top plate 12 into the bottom plate 10 is produced by a narrow ridge 14, which runs around the perimeter of the top surface of the bottom plate 10, the ridge 14 being approximately as high as the top plate is thick.

Each of the four corners of the botlom plate 10 has a bolt hole 16 in it; and each of the four corners of the top plate 12 has a matching bolt hole 18 in it. A bolt hole 20 is in the surface 22 upon which both plates of the cleat are to he mounted, as by bolt 24, washer 26, and nut 28.

Bolts 24, washers 26, and nuts 28 serve not only to mount the cleat to the mounting surface 22, but also serve to clamp the bottom plate 10 between the top plate 12 and the mounting surface 22.

The bolt holes 16, 18 are on the aprons of the plates 10, 12, that is, their flat, peripheral portions, so that (a) this clamping may be spread over the entire surface of the plates 10, 12, (b) the bolts 24 and the operating parts of the cleat will not interfere with each other during the mounting operation or during use, and (c) the bolts 24 will not interfere with the rope during use. The apron of the top plate 10 nests against the apron of the bottom plate 12 to facilitate these results.

Two cylindrical cam spindles 30 protrude from the upper surface of the bottom plate 10, equidistant from the center of the cleat. Indeed, the entire cleat is symmetric ahout a central vertical longitudinal plane.

An annulus 32 is on the top of, and is coaxial with, each cam spindle 30. The external radius of the annulus 32 is less than that of the cam spindle 30. The annulus 32 and cam spindle 30 are composed of the same material as the bottom plate 10, and are integral with it. A cylindrical opening 34 runs along the axis 36 of the annulus 32 and cam spindle 30, and extends to the bottom of the bottom plate 10. The base of the cam spindle 30 includes a curved transition 38 to the top surface of the bottom plate 10, but the base of the annulus 32 includes no such transition to the top surface of the cam spindle 30.

Turning now to FIG. 2, a cam 40 is cylindrical on one side, the dwell. The cam extends to about twice that radius on the other side by incorporating a triangle, one side of which is slightly convex (the rise), and the other side of which is flat (the drop).

Turning now to FIG. 3, the cam 40 includes a cylindrical opening 42, the axis of which is collinear with the axis 36 of the cam spindle 30 and annulus 32. The radius of the opening 42 is just sufficiently larger than the external radius of the cam spindle 30 as to allow free rotation of the cam 40 about the cam spindle 30.

An annular ridge 44, of rectangular cross section, protrudes into the upper center portion of the opening 42. The internal radius of the ridge 44 is just sufficiently larger than the external radius of the annulus 32 as to allow free rotation of the ridge 44 about the annulus 32. The ridge 44 is composed of the same material as the cam 40, and is integral with it. This material is preferably the same material as that which composes the bottom plate 10.

The bottom surface of the ridge 44 rests upon the top surface of the cam spindle 30, thereby supporting the entire cam 40 on the cam spindle 30. The thickness of the ridge 44 is slightly less than the height of the annulus 32, thereby allowing a washer 46 to be retained on the top surface of the annulus 32 by a self-tapping screw 48, without binding the ridge 44 between the annulus 32 and the washer 46.

The interior radius of the washer 46 is slightly larger than the exterior radius of the screw 48, and the exterior radius of the washer 46 is slightly smaller than the interior radius of the opening 42.

The radius of the opening 42 above the ridge 44 may be somewhat enlarged, or reduced (but not less than the internal radius of the ridge 44), in which case the exterior diameter of the washer 46 is likewise enlarged or reduced. The slight differences in radius allow the washer 46 to engage the screw 48 and opening 42 without binding.

The top of the ridge 44 is sufficiently recessed below the top of the cam 40 as to prevent the head of the bolt 48 from protruding excessively above the top of the cam 40.

Returning now to FIG. 2, the bottom of the opening 42 includes an recess 50, which essentially follows the contours of the exterlor of the cam 40. A horizontal C-shaped leaf spring 52, of rectangular cross section, fits into the recess 50.

An angle boss 54 on one end of the spring 52 bends horizontally outward at an angle of approximately 45° with respect to the tangent of the spring at that end. The angle boss 54 protrudes into one of several (here shown as two) further recesses 56, of semicircular horizontal cross section, on the rise side of the cam recess 50.

A rectangular boss 58, formed on the opposite end of the spring 52 by bending the spring 52 to conform to an object with a rectangular horizontal cross section, engages one face of a vertical plate boss 60, which protrudes from the top plate 12. The opposite face of the plate boss 60 engages the opposite side, that is, the drop side, of the cam recess 50 when the spring 52 is as fully extended as possible, thereby biasing the cam 40 as far as possible. The plate boss 60 thereby prevents the cam 40 from rotating beyond some predetermined orientation, and this predetermined orientation can be changed by changing the position of the plate boss 60.

The distance between the plate boss 60 and the axis of rotation 36 is large enough give the spring 52 sufficient purchase to rotate the cam 40, but small enough to be contained within the cam recess 50.

The plate boss 60 is formed by bending a rectangular boss out of the top plate 12, thereby leaving behind a rectangular boss opening 62. The plate boss 60, and corresponding boss opening 62, are oriented so that the faces of the boss 60 will be parallel to the exterior surface of the spring 52 at the end engaging the plate boss 60. Returning now to FIG. 1, the top plate 10 includes two circular cam spindle openings 64, through which the cam spindles 30 protrude. The edge of each cam spindle opening 64 is turned vertically upward for a distance approximately half the height of the cam spindle 30, thereby forming a cam spindle boss 66. The cam spindle boss 66 serves as an adjacent reinforcement against which the cam spindle 30 resides. The lower-interior surface of the cam spindle boss 66 forms an arc which rests upon and conforms to the upper-exterior surface of the base 38 of the cam spindle 30.

The top plate 10 further includes two spaced apart central longitudinal rectangular vertical rope abutment bosses 68, each of which, when bent from the top plate 12, leaves behind a rope abutment opening 70. The edges of the rope abutment openings 70 are parallel to the edges of the top plate 12. The length 72 of each rope abutment opening 70 is approximately five times larger than the width 74 of the rope abutment opening 70, and is approximately two-fifths the length of the top plate 12 itself.

Each rope abutment boss 68 includes a central vertical crimp 76, having an internal angle of approximately 90°, the apex of which rests against the apex of the other crimp 76. The crimps 76 thereby both stiffen the rope abutment bosses 68 and allow them to reinforce each other.

FIG. 4 shows the cross section through the rope abutments 78 and rope abutment bosses 68, taken through the crimps 76. As shown therein, the bases of the crimps 76 do not rest upon the top plate 12. Instead, the crimps 76 are formed by crimping the top plate 12 along with the rope abutment bosses 68.

FIG. 5 shows a parallel cross section, taken away from the crimps 76. Here, the lack of crimping both of the rope abutment bosses 68 and of the portion of the top plate 12 between the bases of the rope abutment bosses 68 is apparent.

Two rectangular rope abutments 78, of the same length as the rope abutment openings 70, and of approximately the same height as the rope abutment bosses 68, protrude from the upper surface of the bottom plate 10 through the rope abutment openings 70. Like the cam spindles 30, they are of the same material as the bottom plate 10, and are integral with it.

The rear surface of each rope abutment 78 rests against the surface of the corresponding rope abutment boss 68 opposite the apex of the crimp 76 thereof. The opposite, front surface of the rope abutment 78 may be smooth, but preferably includes a friction surface, such as a set of rope abutment teeth 80, which may grip the rope. The arcuate triangular portion of the cam 40, that is, the rise, must have some friction surface, preferably cam teeth 82.

The rope abutment teeth 80 and cam teeth 82 preferably are rounded at the top so as to reduce rope chafing and to allow pressure from the rope, as it is drawn down, to spread the cam 40 from the rope abutment 78.

The clamping of the bottom plate 10 between the top plate 12 and the mounting surface 22 not only retains the two plates 10, 12 together, but also assists the cam spindles 30 and rope abutments 78 in resisting the tension of the cleated rope, which said tension would otherwise twist the cam spindles 30 and and rope abutments 78 and lift them from the mounting surface 22.

Further, the upturned cam spindle bosses 66 prevent horizontal movement of the cam spindles 30. The rope abutment bosses 68 likewise prevent horizontal movement of the rope abutments 78.

A retaining loop 84, in the form of an open vertical transverse rectangle, is retained by integral rectangular feet 86 between a rectangular slot 88 in the top plate 12 and a rectangular groove 90 in the top surface of the bottom plate 10. The axes of the loop 84, slot 88, and groove 90 form a transverse vertical plane on the rope tension side of the cleat, that is, the side facing the rise side of the cams 40. This plane is approximately half way between the rope abutments 78 and the front edge of the top plate 12.

The retaining loop 84 is thus immobilized between the top plate 10 and bottom plate 12 in the same fashion as the bottom plate 12 is immobilized between the top plate 10 and the mounting surface 22.

The retaining loop 84 is open on the bottom, and the feet 86 thereof protrude transversely outward. The short (vertical) side of the loop 84 is approximately the same height as the rope abutments 78. The long (transverse) side of the loop 84 is approximately the same width as the space between the cams 40 when they are fully open, that is, when the cam springs 52 are fully compressed.

The slot 88 is just long enough to retain the retaining loop 84, while the groove 90 is just long enough to retain the feet 86, separated as they are by the width of the loop 84. The length (longitudinal with respect to the plates 10, 12) of the loop 84 is much less than either the width (transverse with respect to the plates 10, 12) or height thereof. A slight camber, concave upwards and outward, is provided in the loop 84 for additional strength.

What is claimed is:

1. A rope cleat for releasably securing a rope under tension to a supporting structure, said rope cleat comprising:
    (a) a top plate formed as a stamping from sheet steel and having a plurality of openings extending therethrough and adjacent bosses formed therein and extending upwardly therefrom;

(b) a bottom plate made of injection molded plastic with at least one rope abutment and at least one cam spindle integrally formed therein and extending upwardly therefrom;

(c) said top and bottom plates being nested, with each rope abutment and each cam spindle of the bottom plate protruding through the corresponding opening in the top plate and residing against the adjacent boss formed in the top plate;

(d) a cam rotatably mounted on each cam spindle, the rise of each cam facing a rope abutment;

(e) means connecting the top and bottom plates in nested configuration; and (f) means for mounting the nested plates to the supporting structure.

2. Rope cleat apparatus for releasably holding ropes under tension, the rope cleat comprising:

(a) a top plate in the form of a sheet metal stamping, the top plate having:
 (1) an upturned rope abutment boss formed therein;
 (2) a corresponding rope abutment opening formed adjacent thereto; and
 (3) a cam spindle opening formed therein at a distance therefrom on the side thereof opposite the upturned rope abutment boss;

(b) a bottom plate of molded plastic material, nested with said top plate, and including:
 (1) an upstanding rope abutment formed therein, said rope abutment extending through said rope abutment opening in the top plate and having a rear surface in abutment with said upturned rope abutment boss of the top plate and a front surface facing away from said upturned rope abutment boss with teeth formed thereon; and
 (2) an upstanding cam spindle formed at a distance therefrom, said cam spindle extending through said cam spindle opening in the top plate; and (c) a cam rotatably mounted on said cam spindle of said bottom plate, above said top plate, said cam having a rise facing toward said rope abutment with teeth formed on said rise.

3. The rope cleat of claim 2, wherein the upturned rope abutment boss of the top plate includes a vertical crimp.

4. The rope cleat according to claim 2, further comprising means for retaining the cam on the cam spindle.

5. The rope cleat according to claim 4, wherein:
(a) the cam spindle includes an axial opening therethrough;
(b) the means for retaining the cam on the cam spindle comprises:
 (1) an annulus formed on top of the cam spindle;
 (2) a washer resting on top of the annulus; and
 (3) a self-tapping screw retaining said washer on said annulus, and threadedly engaging the axial opening in the cam spindle; and
(c) the cam includes an internal annular ridge protruding into the gap between the cam spindle and the washer.

6. The rope cleat according to claim 5, wherein:
(a) the edge of the cam spindle opening in the top plate is turned and rounded upwards into an annular cam spindle boss;
(b) the junction of the cam spindle with the bottom plate is rounded to nest with the rounding of the cam spindle boss; and (c) the bottom of the screw is below the top of the cam spindle boss.

7. The rope cleat according to claim 2, further comprising means for biasing the rise of the cam toward the rope to be cleated.

8. The rope cleat according to claim 7, wherein:
(a) the bottom of the cam includes a recess:
(b) the top plate includes an upturned plate boss;
(c) the biasing means comprises a C-shaped leaf spring in the recess, one end of which engages the rise side of the recess and the other end of which engages the plate boss; and
(d) the plate boss engages the drop side of the recess when the cam is fully biased.

9. The rope cleat according to claim 2, further comprising means for retaining the tension side of the rope approximately parallel to the top plate.

10. The rope cleat according to claim 9, wherein the rope retaining means comprises a footed retaining loop, axially cambered for additional strength, penetrating a slot in the top plate; the feet of said loop being retained by the top plate in a groove in the bottom plate.

11. The rope cleat according to claim 2, further comprising means for mounting the cleat onto a mounting surface beneath the bottom plate, wherein said mounting means include means for retaining the top plate against the bottom plate.

12. The rope cleat according to claim 11, wherein the top and bottom plates each includes a plurality of openings around its peripheral apron and wherein the mounting means comprises a plurality of bolts, with associated washers and nuts, penetrating said openings and further penetrating a plurality of associated mounting openings in the mounting surface.

13. Rope cleat apparatus for releasably holding ropes under tension, the rope cleat comprising:

(a) a top plate in the form of a sheet metal stamping, said top plate having:
 (1) a pair of central upturned rope abutment bosses formed therein;
 (2) a corresponding pair of rope abutment openings formed adjacent thereto and immediately outboard thereof; and
 (3) a pair of cam spindle openings formed at a distance further outboard thereof;

(b) a bottom plate of molded plastic material, nested with said top plate, and including:
 (1) a pair of upstanding rope abutments formed centrally therein, said rope abutments extending through said rope abutment openings in the top plate and having rear surfaces in rope abutment with said central upturned rope abutment bosses of the top plate and front surfaces facing outboard; and
 (2) a pair of upstanding cam spindles formed at a distance outboard thereof, said cam spindles extending through said cam spindle openings in the top plate; and (c) a pair of cams rotatably mounted on said cam spindles of said bottom plate, above said top plate, each cam having a rise facing inboard with teeth formed on such rise.

14. The rope cleat of claim 13, wherein each central upturned rope abutment boss of the top plate includes a vertical crimp, and wherein the apexes of said crimps abut each other.

15. Rope cleat apparatus for releasably holding ropes under tension, the rope cleat comprising:

(a) a top plate in the form of a sheet metal stamping, said top plate having:
  (1) a pair of central upturned rope abutment bosses formed therein, each such boss including a vertical crimp, and the apex of each crimp abutting the other;
  (2) a corresponding pair of rope abutment openings formed adjacent thereto and immediately outboard thereof;
  (3) a pair of cam spindle openings formed at a distance further outboard thereof, the edge of the cam spindle opening in the top plate being turned and rounded upwards into a cam spindle boss;
  (4) an upturned plate boss; and
  (5) a plurality of openings around its peripheral apron;
(b) a bottom plate of molded plastic material, nested with said top plate, and including:
  (1) a pair of upstanding rope abutments formed centrally therein, said rope abutments extending through said rope abutment openings in the top plate and having rear surfaces in abutment with said central upturned rope abutment bosses of the top plate and front surfaces facing outboard;
  (2) a pair of upstanding cam spindles formed at a distance outboard thereof, said cam spindles extending through said cam spindle openings in the top plate, each cam spindle including an axial opening therethrough, and the junction of the cam spindle with the bottom plate being rounded to nest with the rounding of the cam spindle boss; and
  (3) a plurality of openings around its peripheral apron;
(c) a pair of cams rotatably mounted on said cam spindles of said bottom plate, above said top plate, each cam having a rise facing inboard with teeth formed on such rise; each cam including an axial opening extending therethrough and an internal annular ridge protruding into the axial opening; the bottom of each cam including a recess, a C-shaped leaf spring being in the recess and biasing the cam, one end of the spring engaging the rise side of the recess and the other end engaging the plate boss, the plate boss also engaging the drop side of the recess when the cam is fully biased;
(d) an annulus formed on top of the cam spindle;
(e) a washer resting on top of the annulus the cam's annular ridge protruding into the gap between the cam spindle and the washer, thereby retaining the cam on the cam spindle;
(f) a self-tapping screw retaining said washer on said annulus, and threadedly engaging the axial opening in the cam spindle, the bottom of the screw being below the top of the cam spindle boss;
(g) a footed retaining loop, axially cambered for additional strength, penetrating a slot in the top plate, the feet of said loop being retained by the top plate in a groove in the bottom plate; and
(h) a plurality of bolts, with associated washers and nuts, penetrating the openings in the peripheral aprons of the plates and further penetrating a plurality of associated mounting openings in the mounting surface.

* * * * *